Patented Mar. 16, 1937

2,074,311

UNITED STATES PATENT OFFICE 2,074,311

PROCESS FOR PURIFYING HYDROGEN

Harold E. Moore, Columbus, Ohio, assignor to The Capital City Products Company, Columbus, Ohio, a corporation of Delaware No Drawing. Application September 7, 1934, Serial No. 743,089

8 Claims. (Cl. 23—210)

My invention relates to a process for purifying hydrogen. It has to do more particularly with the purification of hydrogen for the hardening of edible oils. However, some phases of my invention render it applicable beyond the field of oil hardening.

In the prior art treatment of edible oils, such as margarine, cotton-seed oil and the like, it is generally customary to effect hydrogenation of the oils by the treatment thereof with hydrogen obtained by the steam-iron process or other processes. As ordinarily practiced, this steam-iron process results in the production of hydrogen with a carbon monoxide content which sometimes runs as high as 1%. I have found that the use of hydrogen with such percentages of carbon monoxide serves to retard the hydrogenation of the oil, so that a substantially greater period of time is necessary in the attainment of the desired results than would be necessary if all or substantially all of this carbon monoxide and other poisons could be removed from the hydrogen passed through the oil for the hydrogenation thereof. Likewise, I have found that the texture, hardness and color of the hardened oil suffers as a result of the use of hydrogen containing such proportions of carbon monoxide. Likewise, it becomes necessary to subject the hardened oil to an independent washing operation in order to eliminate the free fatty acids.

One of the objects of this invention is to provide a novel process for the hydrogenation of oil which will insure that the hydrogen which is finally applied to the oil will be free or substantially free of carbon monoxide and other impurities.

Another object of my invention is to provide a novel method for the purification of the hydrogen which is to be applied to oils of the type indicated for the hardening thereof.

Still another object of this invention is to provide a novel type of catalyst for use in the purification of the hydrogen which is to be subsequently applied to the oil for the hydrogenation thereof.

My invention contemplates the treatment of hydrogen, which may have been formed by the steam-iron or other process, in such a manner as to remove therefrom the hydrogen sulphide and other organic sulphur compounds, to remove carbon dioxide and sulphur dioxide by scrubbing with caustic potash or the like, and to remove any entrained particles of caustic potash or similar substance by scrubbing. It then involves the conversion of all or substantially all of the carbon monoxide contained in the hydrogen into methane, which has no harmful effect in hydrogenating oils, this conversion into methane being effected by passing the hydrogen in contact with a special catalyst at elevated temperatures. Thereupon, the hydrogen which has thus been purified is dried and passed through the oil to be hydrogenated, so that hardening of such oil is produced.

More specifically, I preferably take commercial hydrogen made by the steam-iron process or other commercial processes, and remove the hydrogen sulphide and other organic sulphur compounds therefrom by passing it through a container and over hydrated iron oxide disposed in such container. This hydrated iron oxide is preferably in the form of iron turnings, borings or shavings and is supported on wood shavings so that it will be light and fluffy to facilitate the ready passage of the gas therethrough. The humidity in this container is preferably from 45% to 90% and is obtained by wetting the wood shavings and by saturating the impure hydrogen gas with water vapor as it passes from its container into the container for the hydrated iron oxide. The humidity indicated brings about the desired reaction more readily. As a result of this passage of the impure hydrogen in contact with the iron oxide, the iron oxide reacts with the hydrogen sulphide and other organic sulphur compounds and absorbs the sulphur. The main reaction is indicated by the following equation:

$$Fe_2O_3.xH_2O + 3H_2S = Fe_2S_3 + (x+3)H_2O$$

After the iron oxide has been used for some time, it may be revivified for further use by removing it from its container and spreading it out under subjection to the atmosphere; or, if desired, revivification may be obtained by passing air through the container with the iron oxide therein. The reaction which takes place in the revivification of the iron oxide is indicated by the following equation:

$$2Fe_2S_3 + 3O_2 + 2xH_2O = 2Fe_2O_3.xH_2O + 6S$$

The removal of the hydrogen sulphide and other organic sulphur compounds of an objectionable nature may be effected in other ways. For example, instead of using iron oxide, I may use finely divided particles of metallic iron.

After the removal of these organic sulphur compounds from the hydrogen, it is then subjected to a treatment for the removal of carbon dioxide and sulphur dioxide. This is preferably accomplished through the medium of absorption by caustic potash or caustic soda. The gas is preferably conducted upwardly through a tank or tower while a concentrated solution of caustic potash or caustic soda is sprayed downwardly through such tank or tower. This scrubbing action results in the absorption of the carbon dioxide and sulphur dioxide by the caustic potash or caustic soda. The solution of caustic potash or caustic soda should be renewed from time to time, after it becomes charged to a certain extent.

Elimination of the carbon dioxide and sulphur dioxide may be effected in other ways. Thus, I may use water under high pressure, preferably from 20 to 100 atmospheres. In this case, the water is preferably sprayed continuously down through the tank or tower while the gas passes upwardly therethrough, the water being continuously removed from the bottom of the tank or tower.

I may also use triethanolamine or diethanolamine in performing this scrubbing operation. When the triethanolamine or diethanolamine become saturated with carbon dioxide and sulphur dioxide, they may be heated and the reaction will be reversed. Then, they may be used over again. I may also use a solution of sodium carbonate or a solution of potassium carbonate. When these become saturated with the carbon dioxide and sulphur dioxide, they may be heated to reverse the reaction so that they may be used again.

This same scrubbing action is repeated in order that substantially all traces of carbon dioxide and sulphur dioxide will be removed from the gas. Thus, the gas is subjected to two identical scrubbing actions.

In order to remove any entrained particles of caustic potash, caustic soda or the like which may remain after this treatment for the absorption of carbon dioxide and sulphur dioxide, I preferably pass the partially purified hydrogen upwardly through a chamber filled with particles of substantially pure metallic copper. These particles may take the form of turnings, borings, shavings or finely divided wire. A mechanical scrubbing action is thus effected and this scrubbing action serves to remove any entrained particles of caustic potash, caustic soda or the like. The particles of copper may be cleansed from time to time by washing with water.

This mechanical scrubbing for removal of the entrained particles of caustic potash or the like may be effected by the use of other materials as substitutes for the copper particles. Thus, I may use activated carbon, silica gel, activated aluminum oxide gel or steel wool.

When this gas leaves this scrubbing chamber, it still contains a substantial amount of carbon monoxide, which may run as high as 1%. I have devised a way of converting this carbon monoxide into methane rapidly and effectively during its passage through a catalytic reaction chamber. The nature of the catalyst is important, however, and it is prepared in the following way.

My preferred catalyst is comprised of nickel, copper and thorium. The nickel and copper are preferably in a finely divided state, such as wire or wool, which has been activated by treatment with nitric acid so that the surfaces thereof are copper nitrate and nickel nitrate, respectively. The thorium is initially introduced as thorium nitrate.

The proportions of the ingredients which make up this preferred form of catalyst are preferably, approximately, 2% thorium oxide, 10% copper and 88% nickel. However, it is possible to use from, approximately, 1% to 3% thorium oxide, 5% to 15% copper and the balance of the composition nickel.

After these materials are assembled, they are then heated until the nitrates are decomposed to form oxides of the metals on the surfaces of the nickel and copper and to convert the thorium nitrate to thorium oxide. While these materials are still hot, a portion of the hydrogen gas is passed over them to reduce the nickel oxide and the copper oxide to metallic nickel and metallic copper, respectively, while the thorium oxide remains unchanged. The reduction of the nickel oxide and the copper oxide may be symbolized as follows:

$$NiO + H_2 = Ni + H_2O$$
$$CuO + H_2 = Cu + H_2O$$

The catalyst is now ready for use and the hydrogen gas, after first being heated to a temperature of from 200° C. to 350° C., is passed through the catalytic reaction chamber which contains the catalyst. This results in the conversion of the carbon monoxide of the impure hydrogen into methane, with water being formed as a by-product. This hydrogenation of carbon monoxide into methane may be symbolized as follows:

$$CO + 3H_2 = CH_4 + H_2O$$

Thus, the carbon monoxide which is quite poisonous to certain catalysts such as are generally used in the hydrogenation of vegetable oils is converted into methane which is without harmful effect upon such catalysts. Moreover, I have found that the elimination of the carbon monoxide thus effected permits a more rapid hydrogenation of vegetable oils and results in a product of improved texture, hardness, color and odor and also results in improved chemical properties. Furthermore, less hydrogen is required for the hydrogenation of oils and the customary step of washing the hydrogenated oils to remove the free fatty acids is eliminated.

In addition to the conversion of the carbon monoxide into methane and water by its reaction with the hydrogen under the influence of the catalyst, the copper in the catalyst decomposes any organic sulphur compounds which may have remained in the gas being purified. Comparative tests indicate that my catalyst which is composed of nickel, copper and thorium oxide makes possible the removal of a larger percentage of carbon monoxide than any other catalyst with which I am familiar. As a matter of fact, it will remove practically all of the carbon monoxide found in hydrogen made by the steam-iron or other commercial processes, which frequently runs as high as 1% by volume.

Certain other catalytic mixtures may be used by me in the hydrogen purification phase of my process, though tests which I have made indicate that they are not as effective as the combination of nickel, copper and thorium oxides. For example, I may use a mixture comprising nickel and thorium oxide, the nickel and thorium being activated as in the three-part catalyst. I may also use metallic nickel alone and the surface thereof must be activated also.

I have also found that it is possible to use a mixture of nickel and aluminum as a catalytic mass, though this mixture is not as effective as the three-part mixture above described. When nickel and aluminum are used, the surface of the nickel is activated by treatment with nickel nitrate and the surface of the aluminum is activated by treatment with aluminum nitrate. The nitrates thereby formed on the surfaces of the metals are then heated so that the nitrates are changed into the oxides of the metals. These oxides are then reduced by passing hydrogen through the catalytic mass.

I may also form the catalyst by taking porous earthenware material or other such material and breaking it up into fine pieces. Then, the fine pieces are soaked in a solution of nickel and thorium nitrate. This forms nitrates of the metals on the pieces of earthenware. The mixture is then heated to change the nitrates to oxides of the metals. The oxides of the metals are then reduced in hydrogen as before.

After the gas leaves the catalytic reaction chamber, it is then cooled down to room temperature, about 70° F., by means of a water-cooler. In this cooling of the gas, some of the moisture, formed during the activation of the metal catalyst and during the changing of carbon monoxide to methane, is precipitated out of the hydrogen gas. However, it is desirable to remove water vapor and dry the gas sufficiently to bring it to a dew point of −60° F.

The gas is dried preferably by an adsorption process. This is accomplished by passing the gas through a drier in which is disposed alumina gel, silica gel or activated carbon.

Instead of using a process of adsorption for drying the gas, a chemical drier may be used. Thus, the gas may be passed through sulphuric acid or calcium oxide which will remove the moisture therefrom.

After the gas leaves the drier, it may be conducted to a storage chamber and compressed and then taken, as desired, and introduced into the tank of oil to be hydrogenated. This introduction is preferably effected through the medium of a pipe which projects downwardly into the bath of oil to be hardened and which delivers the hydrogen adjacent the bottom of the oil bath. The hydrogen then bubbles up through the oil which is preferably being subjected to agitation and brings about a hardening of the oil. It will be understood that this hardening operation is preferably effected in the presence of a catalyst which may take the form of finely divided nickel, which is subsequently eliminated from the product by filtration, as by passing through a filter press.

It will be seen from the above that I have provided a novel process for the hydrogenation of oils wherein the hydrogenation of the oils may be effected with a smaller amount of hydrogen, this being evidently due to the fact that all or substantially all of the carbon monoxide and other impurities have been removed from the hydrogen before it is introduced into the oil to be hardened. Furthermore, as a result of my process, the hydrogenation of the oil may be effected in a substantially shorter period of time than hitherto possible. Likewise, I find that my novel process results in the production of oils of improved texture, hardness, color and odor and that the chemical properties of these oils resulting from my process are materially improved. In addition, I am able to dispense with the step of washing the hardened oil to remove the free fatty acids which has previously been considered necessary in the art.

It will also be seen that one phase of my invention deals with the purification of hydrogen. It will be apparent that this purified hydrogen is capable of use in other fields than the hydrogenation of oils. For example, it is capable of application in the preparation of hydrogen for use in annealing metals, where oxidation of the metals is considered undesirable.

It will likewise be seen that I have provided a novel form of catalyst which possesses a higher degree of efficiency than prior catalysts which have been used to assist in the elimination of the carbon monoxide and other impurities from the hydrogen. Thus, the ultimate hydrogenation of the oil is materially improved and the hydrogen produced is of a purer quality than hitherto obtainable.

Another advantage resulting from my invention is that a relatively small body of catalyst material may be used, with the result that a smaller catalyst chamber will suffice, with a consequent decrease in the cost of the required purification apparatus.

On the whole, my process effects material savings in the cost of hydrogenating oils while, at the same time, materially improving the product and making possible a substantially increased output in a given period of time.

Having thus described my invention, what I claim is:

1. The process of purifying commercial hydrogen gas which comprises removing the carbon monoxide therein by converting it into methane in the presence of a catalyst formed from a mixture of nickel, copper and thorium oxide, the nickel and copper being in a finely divided state and having activated surfaces.

2. The process of purifying commercial hydrogen gas which comprises removing the carbon monoxide therein by converting it into methane in the presence of a catalyst formed from a mixture of from 1% to 3% thorium oxide, from 5% to 15% copper and the balance nickel, the nickel and copper being in a finely divided state and having activated surfaces.

3. The process of purifying commercial hydrogen gas which comprises removing the carbon monoxide therein by converting it into methane in the presence of a catalyst formed from a mixture of, approximately, 2% thorium oxide, 10% copper and the balance nickel, the nickel and copper being in a finely divided state and having activated surfaces.

4. The process of purifying commercial hydrogen gas which comprises heating it to from 200° C. to 350° C. and then passing it in contact with a catalyst formed from a mixture of nickel, copper and thorium oxide, the nickel and copper being in a finely divided state and having activated surfaces.

5. The process of purifying commercial hydrogen gas which comprises heating it to a temperature ranging from 200° C. to 350° C. and then passing it in contact with a catalyst formed from a mixture of from 1% to 3% thorium oxide, 5% to 15% copper and the balance nickel, the nickel and copper being in a finely divided state and having activated surfaces.

6. A catalyst for purifying commercial hydrogen comprising nickel, copper and thorium oxide, the nickel and copper being in a finely divided state and having activated surfaces.

7. A catalyst for purifying commercial hydrogen comprising from 1% to 3% thorium oxide, from 5% to 15% copper and the balance nickel, the nickel and copper being in a finely divided state and having activated surfaces.

8. A catalyst for purifying commercial hydrogen comprising, approximately, 2% thorium oxide, 10% copper and the balance nickel, the nickel and copper being in a finely divided state and having activated surfaces.

HAROLD E. MOORE.